Jan. 12, 1926.
A. W. DALFERES
AUTOMOBILE LOCK
Filed April 11, 1925
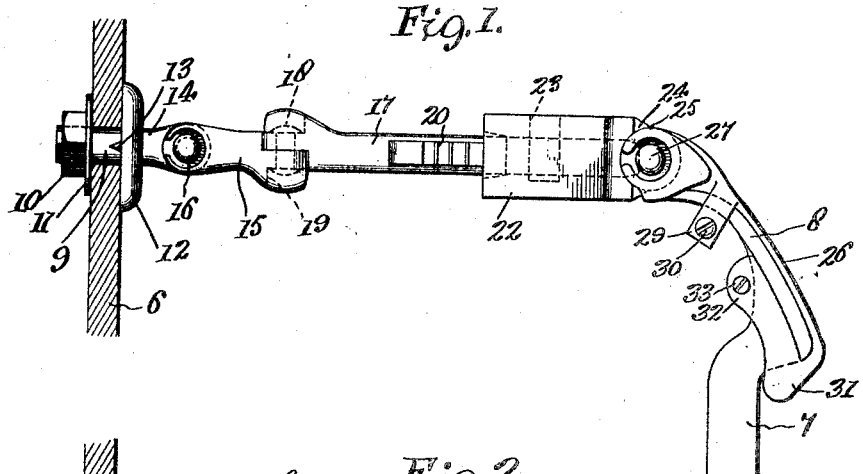
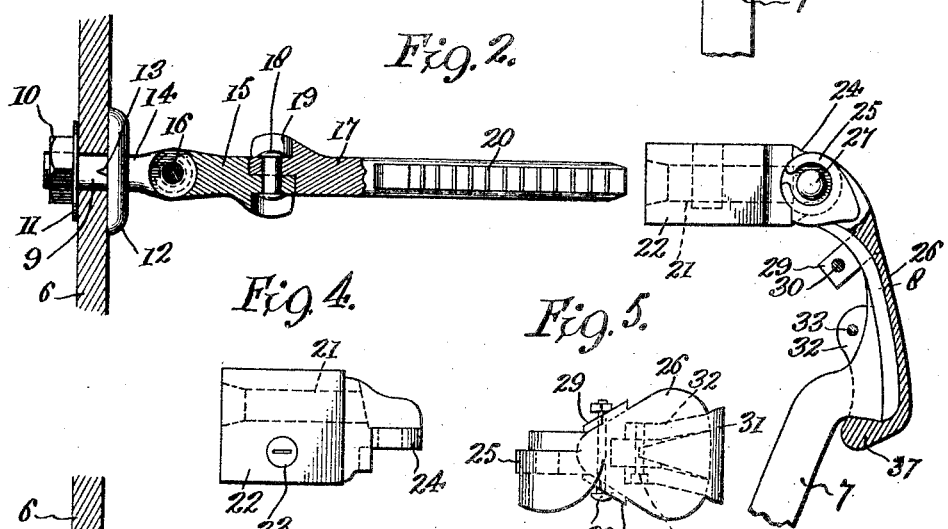
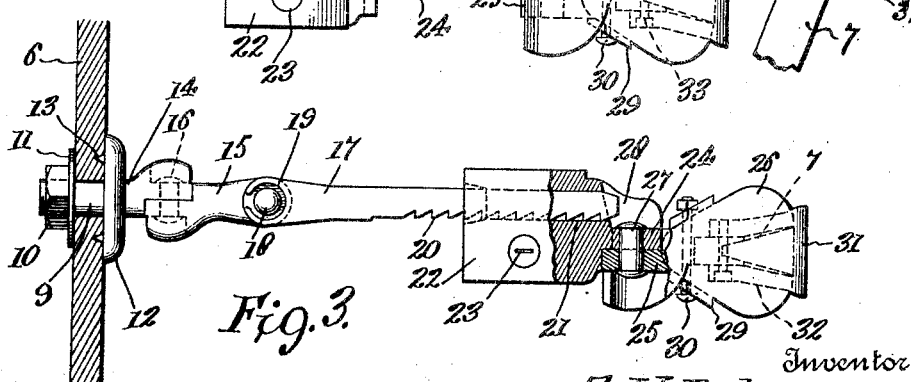
Inventor
A. W. Dalferes
by Wilkinson & Giusta
Attorneys.

Patented Jan. 12, 1926.

1,569,721

UNITED STATES PATENT OFFICE.

ANTHONY WILMOT DALFERES, OF LAFAYETTE, LOUISIANA.

AUTOMOBILE LOCK.

Application filed April 11, 1925. Serial No. 22,281.

*To all whom it may concern:*

Be it known that I, ANTHONY WILMOT DALFERES, a citizen of the United States, residing at Lafayette, in the parish of Lafayette and State of Louisiana, have invented certain new and useful Improvements in Automobile Locks; and I do hereby declare the following to be a full, clear, and exact description of the invention, such as will enable others skilled in the art to which it appertains to make and use the same.

The present invention relates to improvements in automobile locks and has for an object to provide a lock that will hold the reverse pedal of a Ford automobile in the forward or engaged position.

There are a great many locks already proposed such as steering wheel locks, ignition locks, transmission locks and the like but the police records show that all these devices are not effective in preventing theft.

Derricks are used to haul off cars that are locked with loose steering wheels; shunts are used to avoid ignition locks and towing lines are used when the cars are locked in neutral.

The idea of locking in reverse permits the car to be moved but only in the reverse direction. A car being towed forward does not attract attention of the police officer, and no thief would dare attempt to drag a car backwards.

A further object of the invention is to provide an effective lock of the above character such as can be readily engaged and disengaged by the authorized proprietor of the vehicle and the parts are so arranged and cooperated as to be capable of installation on the vehicle without requiring any modification in the structure thereof.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a cross section through the dash of a Ford automobile showing also the fragmentary view of the reverse pedal and the improved appliance.

Figure 2 is a similar view with parts in section and with the locking device disengaged.

Figure 3 is a top plan view, with parts shown in section showing the lock engaged.

Figure 4 is a detached view of the lock casing, and

Figure 5 is a detached plan view of the pedal engaging plate.

Referring more particularly to the drawings 6 designates the dash board of a Ford automobile and 7 the shank of the reverse pedal which is indicated at 8.

Figure 2 shows the normal position of the pedal which is biased to the rear position and is only moved forwardly by the foot of the operator when it is intended to move the vehicle backwards. The idea is to provide means for holding and locking the pedal in the forward position so as to avoid movement of the vehicle except in the reverse direction.

The improved device is held to the dash 6 by means of a bolt 9 threaded on the forward side of the dash to receive the nut 10, a washer 11 being preferably interposed between the nut and the dash. A plate or flange 12 is carried by the bolt 9 and fits against the forward side of the dash, said plate being provided with prongs 13 for engaging the dash to hold the bolt and other parts against rotation.

The bolt is provided with a rearward extension 14 pivoted to the intermediate link 15 by the rivet or pivot bolt 16. The meeting portions of the bolt extension 14 and link 15 are laterally engaged to provide deep sockets in which the upset heads of the pivot pin 16 are securely held. These lateral engagements protect the rivet and prevent thieves from using cold chisels or bolt cutters to work the rivet head out of its position. The rivet axis is substantially horizontal which permits of the locking of the link 15 into substantially vertical direction. The link 15 is in turn pivoted to the locking bolt 17, the rivet 18 formnig the pivot joint in this instance having its axis disposed at substantially right angles to the axis of the rivet 16 whereby the bolt 17 may swing about the link in a substantially horizontal direction. The bolt 17 is capable of a universal movement about both pivot joints. The rivet 18 is similarly protected by the enlargements 19 extending about the heads. The bolt is provided with teeth 20 for entering the socket 21 of the lock casing 22 provided with the key hole 23 to receive a key kept about the person of the proprietor of the vehicle. The locking of the bolt in the lock casing is effective by simply thrusting the bolt through socket 21 to the desired position or thrusting the lock casing 21 along the bolt.

The lock casing is provided at one end, namely the end away from the bolt, with a perforated extension web 24, adapted to extend along side of a companion perforated web 25 extending from the pedal engaging plate 26.

A rivet 27 is passed through the two webs and the ends of the rivet upset in order to pivotally secure the webs together and hence the lock casing 22 has a pivotal movement with respect to the pedal engaging plate 26. The substantially circular flanges 28 are made on the casing and web 25 in order to protect the rivet heads and to provide deep sockets for the same.

The axis of the rivet 27 is substantially horizontal. The plate 26 is of substantially the form of the pedal 8 and is pivoted so as to afford a surface to the foot of the operator. Near its upper end, the plate is provided with down turned lugs 29 for receiving the bolt 30 beneath the pedal plate by which the upper portion of the plate is securely held in place, the lugs extending against the side edges of the pedal. The lower end portion 31 of the plate is bent up against the lower edge of the pedal and pedal shank and wings 32 are bent upwardly beneath the pedal and against the sides of the shank 7, these wings extend up above the upper edge of the shank and a bolt 33 is passed between the same for the purpose of clamping the wings against the shank.

In the use of the device the parts are applied as shown in Figures 1, 2 and 3 and during the operation of the vehicle the locking casing 22 will be disengaged from the bolt 17. This position is indicated in Figure 2 except that the bolt 17 and link 15 will fall down against the foot boards or toe boards or to a bracket provided to receive same.

The lock casing will also swing down against the end side of the pedal. In this position the pedal may be moved back and forth and the vehicle reversed as desired. When the operator brings the vehicle to a stop and wishes to park same, he simply swings the lock casing and the bolt up into the position shown in Figure 2 and then thrusts the pedal rearwardly so that the bolt enters the lock casing and is automatically locked. The pedal is pushed all the way back and is held in reverse position until the operator returns and inserts his key in the opening 23 whereupon the pedal springs back to its normal position.

The device will be found of simple construction and economical to manufacture. It is very effective in preventing theft.

It is obvious that various changes and modifications may be made in the details of construction and design of the above specifically described embodiment of this invention without departing from the spirit thereof, such changes and modifications being restricted only by the scope of the following claims.

What is claimed is:—

1. In combination with an automobile having a reverse pedal and a plate attached thereto, a locking bolt attached to said automobile, a locking casing pivotally attached to the top portion of said plate and cooperating with said locking bolt and adapted to lie behind said pedal when in disengaged position.

2. In combination with an automobile having a reverse pedal and a pedal shank, a locking bolt attached to said automobile, a plate of substantially the same form as said pedal having its lower end portion bent against the pedal shank and the lower edge of said pedal, wings attached to said plate adapted to straddle said pedal and pedal shank, means for connecting said wings to secure said plate to said pedal, and a locking casing attached to said reverse pedal cooperating with said locking bolt and adapted to lie behind said pedal when in disengaged position.

3. In combination with an automobile having a reverse pedal and a pedal shank, a locking bolt attached to said automobile, a plate attached to said pedal, an angular end portion on said plate fitted against said pedal shank and the lower edge of said pedal, wings extending upwardly and rearwardly from said angular portion and binding against said pedal shank and the back of said pedal, means at the free end of said wings for securing same behind the top portion of said pedal shank, lugs on the upper portion of said plate extending downwardly and rearwardly and binding against the side edges of said pedal, means at the free end of said lugs for connecting the same, and a locking casing pivotally attached to said plate cooperating with said locking bolt and adapted to lie behind said pedal when in disengaged position.

4. In combination with an automobile having a reverse pedal and plate attached thereto, a bolt secured to said automobile, a link pivoted to said bolt, a locking bolt pivoted to said link, a locking casing pivotally attached to said plate and adapted to cooperate with said bolt, webs on said link, locking bolt and locking casing, rivet members passing through said webs, and flanges on said webs to provide sockets for the heads of said rivet members.

A. WILMOT DALFERES.